(12) United States Patent
Ikenishi

(10) Patent No.: US 8,633,121 B2
(45) Date of Patent: *Jan. 21, 2014

(54) FLUOROPHOSPHATE GLASS, GLASS MATERIAL FOR PRESS MOLDING, OPTICAL ELEMENT BLANK, OPTICAL ELEMENT, PROCESSES FOR PRODUCTION OF SAME, AND PROCESS FOR PRODUCTION OF GLASS MOLDINGS

(75) Inventor: Mikio Ikenishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 153 days.

This patent is subject to a terminal disclaimer.

(21) Appl. No.: 13/146,431

(22) PCT Filed: Aug. 26, 2009

(86) PCT No.: PCT/JP2009/064885
§ 371 (c)(1),
(2), (4) Date: Jul. 27, 2011

(87) PCT Pub. No.: WO2011/024270
PCT Pub. Date: Mar. 3, 2011

(65) Prior Publication Data
US 2011/0287922 A1 Nov. 24, 2011

(51) Int. Cl.
*C03C 3/247* (2006.01)
*C03C 3/17* (2006.01)

(52) U.S. Cl.
USPC ........ 501/44; 501/48; 65/66; 65/102; 65/122; 65/126

(58) Field of Classification Search
USPC ................... 501/44, 48; 65/66, 102, 122, 126
See application file for complete search history.

(56) References Cited

U.S. PATENT DOCUMENTS

| | | | |
|---|---|---|---|
| 3,671,276 A | 6/1972 | Bromer et al. | |
| 4,120,814 A | 10/1978 | Izumitani et al. | |
| 4,225,459 A | 9/1980 | Faulstich et al. | |
| 4,427,784 A | 1/1984 | Nakamura et al. | |
| 4,771,020 A | 9/1988 | Omata et al. | |
| 4,990,468 A | 2/1991 | Komiya et al. | |
| 5,017,520 A | 5/1991 | Otsuka et al. | |
| 5,635,109 A | 6/1997 | Otsuka | |
| 5,755,998 A | 5/1998 | Yamazaki et al. | |
| 7,192,897 B2 | 3/2007 | Yamane et al. | |
| 7,595,272 B2 | 9/2009 | Ikenishi et al. | |
| 8,158,541 B2 * | 4/2012 | Ikenishi et al. | 501/43 |
| 8,206,830 B2 * | 6/2012 | Zou et al. | 428/426 |
| 8,261,579 B2 * | 9/2012 | Ikenishi et al. | 65/61 |
| 8,354,352 B2 * | 1/2013 | Ikenishi | 501/44 |
| 2005/0188724 A1 * | 9/2005 | Ikenishi et al. | 65/31 |
| 2005/0247658 A1 | 11/2005 | Renz | |
| 2006/0223689 A1 | 10/2006 | Ikenishi et al. | |
| 2007/0027017 A1 | 2/2007 | Hachitani | |
| 2007/0060464 A1 | 3/2007 | Ikenishi et al. | |
| 2007/0096067 A1 | 5/2007 | Zou et al. | |
| 2008/0132400 A1 | 6/2008 | Hachitani | |
| 2009/0247386 A1 | 10/2009 | Ikenishi | |
| 2009/0247387 A1 | 10/2009 | Ikenishi | |
| 2009/0247388 A1 | 10/2009 | Ikenishi | |
| 2009/0298668 A1 | 12/2009 | Ikenishi | |
| 2009/0314033 A1 | 12/2009 | Zou et al. | |
| 2009/0325774 A1 | 12/2009 | Ikenishi | |
| 2010/0113247 A1 | 5/2010 | Ikenishi | |
| 2010/0130246 A1 | 5/2010 | Biertumpfel et al. | |
| 2012/0111061 A1 * | 5/2012 | Ikenishi | 65/99.1 |

FOREIGN PATENT DOCUMENTS

| | | |
|---|---|---|
| DE | 3609803 A1 | 10/1986 |
| DE | 3634674 A1 | 4/1987 |
| DE | 10-2006-033434 A1 | 2/2007 |
| EP | 0709345 A1 | 5/1996 |
| EP | 1516862 A1 | 3/2005 |
| EP | 2019087 A1 | 1/2009 |
| JP | 49-130409 | 12/1974 |
| JP | 53-105517 A | 9/1978 |
| JP | 53-132014 A | 11/1978 |
| JP | 5571643 A | 5/1980 |
| JP | 55-144448 A | 11/1980 |
| JP | 2-124740 A | 5/1990 |
| JP | 6-157068 A | 6/1994 |
| JP | 7-157330 A | 6/1995 |
| JP | 8-104538 A | 4/1996 |
| JP | 8-133780 A | 5/1996 |
| JP | 10-139454 A | 5/1998 |
| JP | 11-060267 A | 3/1999 |
| JP | 2000-290025 A | 10/2000 |
| JP | 2001-278636 A | 10/2001 |

(Continued)

OTHER PUBLICATIONS

Machine Translation of JP 08-104538, Apr. 23, 1996.*
Notification of Reasons for Refusal dated Jul. 10, 2012, issued by the Japanese Patent Office in corresponding Japanese Patent Application No. 2008-047135.
English Language Translation of Tables 1-3 for JP8-104538A.
Decision for Rejection dated Dec. 16, 2010 in Japanese Patent Application No. 2008-228292.
Final Office Action, dated Nov. 23, 2012, issued by the United States Patent and Trademark Office in related U.S. Appl. No. 12/412,923.

(Continued)

*Primary Examiner* — Karl Group
*Assistant Examiner* — Elizabeth A Bolden
(74) *Attorney, Agent, or Firm* — Sughrue Mion, PLLC

(57) ABSTRACT

The present invention provide a fluorophosphate glass comprising 3 to 25 cation % of $P^{5+}$, more than 30 cation % and 40 cation % or less of $Al^{3+}$, 0.5 to 20 cation % of $Li^+$ and 65 anion % or more of $F^-$ as glass ingredients, and having a liquid phase temperature of 700° C. or less. The fluorophosphate glass of the present invention has ultra low dispersibility and stability, and is preferably used for glass materials for press molding, optical element blanks and optical elements.

17 Claims, No Drawings

(56) References Cited

FOREIGN PATENT DOCUMENTS

| | | |
|---|---|---|
| JP | 2003-26424 A | 1/2003 |
| JP | 2003-040645 A | 2/2003 |
| JP | 2005-75687 A | 3/2005 |
| JP | 2005-142037 A | 6/2005 |
| JP | 2005-247658 A | 9/2005 |
| JP | 2006-306706 A | 11/2006 |
| JP | 2007-055883 A | 3/2007 |
| JP | 2007-76958 A | 3/2007 |
| JP | 2007-099525 A | 4/2007 |
| JP | 2007-101585 A | 4/2007 |
| JP | 2007-161944 A | 6/2007 |
| JP | 2007-176763 A | 7/2007 |
| JP | 2007-269614 A | 10/2007 |
| JP | 2008-013378 A | 1/2008 |
| JP | 2008-509440 A | 3/2008 |
| JP | 2009-203114 A | 9/2009 |
| WO | 2007/114172 A1 | 10/2007 |
| WO | 2008/004648 A1 | 1/2008 |
| WO | WO 2008111439 A1 * | 9/2008 |

OTHER PUBLICATIONS

Notice of Reasons for Rejection dated Nov. 25, 2011, issued by the Japanese Patent Office in Japanese Application No. 2008-228270.

Japanese Office Action dated Apr. 27, 2010, for Application No. 2008-228278.

Japanese Office Action dated Apr. 27, 2010 in Japanese application No. 2008-228292.

Notification of Reasons for Rejection dated Jan. 5, 2011, in Japanese Application No. 2008-228270.

Notification of Reasons for Refusal dated Apr. 22, 2010, issued in a counterpart Japanese Application No. 2008-228270.

Japanese Office Action dated Dec. 16, 2010, in Japanese Application No. 2008-228278.

Extended European Search Report issued in EP 09250877.9-1218, dated Jul. 30, 2009.

U.S. Non-Final Office Action issued in related U.S. Appl. No. 12/412,716 on Dec. 10, 2010.

U.S. Non-Final Office Action issued in related U.S. Appl. No. 12/412,807 on Dec. 10, 2010.

U.S. Final Office Action issued in related U.S. Appl. No. 12/412,716 on Jul. 7, 2011.

U.S. Final Office Action issued in related U.S. Appl. No. 12/412,807 on Jul. 7, 2011.

U.S. Non-Final Office Action issued in related U.S. Appl. No. 12/412,923 on Apr. 15, 2011.

International Search Report issued in International Application No. PCT/JP2009/065884 on Oct. 27, 2009.

* cited by examiner

FLUOROPHOSPHATE GLASS, GLASS MATERIAL FOR PRESS MOLDING, OPTICAL ELEMENT BLANK, OPTICAL ELEMENT, PROCESSES FOR PRODUCTION OF SAME, AND PROCESS FOR PRODUCTION OF GLASS MOLDINGS

TECHNICAL FIELD

The present invention relates to a fluorophosphate glass suitable for materials of optical elements such as lenses, prisms and filters. Additionally, the present invention relates to a glass material for press molding, an optical element blank and an optical element, each of which comprises the fluorophosphate glass; a method for manufacturing the same; and a method for manufacturing a glass molded body.

BACKGROUND ART

A fluorophosphate glass has been used as a glass having features such as low dispersibility and anomalous dispersibility for various applications including a glass for correction of chromatic aberration.

One example of such a fluorophosphate glass is disclosed in Patent Document 1. In the glass disclosed in claim 1 of Patent Document 1, a lithium (Li) ingredient is introduced so as to obtain viscosity suitable for molding even when the glass temperature is decreased in order to decrease or prevent the occurrence of striae in the case of molding the molten glass, and in order to suppress an increase in glass transition temperature or liquid phase temperature, the amount of an aluminum (Al) ingredient is limited to 30 cation % or less.

PRIOR-ART DOCUMENTS

Patent Documents

Patent Document 1: JP-A-2006-306706

SUMMARY OF THE INVENTION

Problems to be Solved by the Invention

By the way, the above fluorophosphate glass realizes high qualities over the whole low dispersion region. However, when emphasis is placed on an ultra low dispersion region, there is room for improvement.

Objects of the present invention are to provide a fluorophosphate glass having ultra low dispersibility and excellent stability, to provide a glass material for press molding, an optical element blank and an optical element, each of which is composed of the above fluorophosphate glass, and a method for manufacturing the same, and to provide a method for manufacturing a glass molded body comprising the above glass.

Means for Solving the Problems

In order to achieve the above objects, the inventors of the present invention have made intensive studies. As a result, it has been found that a fluorophosphate glass having ultra low dispersibility and excellent stability can be obtained by increasing the ratio of $O^{2-}$ to $P^{5+}$ ($O^{2-}/P^{5+}$) to decrease the content of $P^{5+}$ as a network forming ingredient and increasing the content of $Al^{3+}$ as an another network forming ingredient in the fluorophosphate glass, in order to suppress volatility thereof. Based on the finding, the present invention has been accomplished.

Namely, according to the present invention,

[1] A fluorophosphate glass comprising
 3 to 25 cation % of $P^{5+}$,
 more than 30 cation % and 40 cation % or less of $Al^{3+}$,
 0.5 to 20 cation % of $Li^+$ and
 65 anion % or more of $F^-$ as glass ingredients, and
 having a liquid phase temperature of 700° C. or less;

[2] The fluorophosphate glass according to the above [1] comprising
 0 to 15% of $Mg^{2+}$,
 5 to 35% of $Ca^{2+}$,
 5 to 25% of $Sr^{2+}$,
 0 to 20% of $Ba^{2+}$,
 0 to 10% of $Na^+$,
 0 to 10% of $K^+$ and
 0 to 5% of $Y^{3+}$, expressed by cation %;

[3] The fluorophosphate glass according to the above [1] or [2] having an Abbe number vd of 85 to 98;

[4] A glass material for press molding comprising the fluorophosphate glass according to any one of the above [1] to [3];

[5] An optical element blank comprising the fluorophosphate glass according to any one of the above [1] to [3];

[6] An optical element comprising the fluorophosphate glass according to any one of the above [1] to [3];

[7] A method for manufacturing a glass molded body comprising melting glass raw materials and pouring the resulting molten glass into a mold to mold the glass molded body, wherein
 the grass raw materials are blended and melted so as to obtain the fluorophosphate glass according to any one of the above [1] to [3];

[8] A method for manufacturing a glass material for press molding comprising processing the glass molded body manufactured by the method according to the above [7];

[9] A method for manufacturing a glass material for press molding comprising molding glass raw materials into a preform used for precision press molding in the course of melting the raw materials; allowing the resulting molten glass to flow out; separating a lump of the molten glass from a flow of the molten glass; and cooling the lump of the molten glass, wherein
 the grass raw materials are blended and melted so as to obtain the fluorophosphate glass according to any one of the above [1] to [3];

[10] A method for manufacturing an optical element blank comprising heating, softening and press-molding the glass material for press molding according to the above [4] or the glass material for press molding manufactured by the method according to the above [8];

[11] A method for manufacturing an optical element blank comprising melting raw materials; allowing the resulting molten glass to flow out; separating a lump of the molten glass from a flow of the molten glass; and press-molding the lump of the molten glass, wherein
 the grass raw materials are blended and melted so as to obtain the fluorophosphate glass according to the above [1] to [3];

[12] A method for manufacturing an optical element comprising grinding and polishing the optical element blank manufactured by the method according to the above [10] or [11];

[13] A method for manufacturing an optical element comprising heating and precision press-molding the glass material for press molding according to the above [4] or the glass material for press molding manufactured by the method according to the above [9] with using a press mold;

[14] The method for manufacturing an optical element according to the above [13], wherein the glass material for press molding is introduced into the press mold, and the glass material and the press mold are heated together to perform the precision press molding; and

[15] The method for manufacturing an optical element according to the above [13], wherein the glass material for press molding is heated and introduced into the press mold which is pre-heated to perform the precision press molding. are provided.

Effect of the Invention

According to the present invention, a fluorophosphate glass having ultra low dispersibility and excellent stability can be provided.

Additionally, a glass material for press molding, an optical element blank and an optical element, each of which comprises the above fluorophosphate glass, and a method for manufacturing the same can be provided. Furthermore, a method for manufacturing a glass molded body comprising of the above glass can be provided.

MODE FOR CARRYING OUT THE INVENTION

[Fluorophosphate Glass]

The fluorophosphate glass of the present invention is described below.

Feature of the fluorophosphate glass of the present invention is the fluorophosphate glass comprising 3 to 25 cation % of $P^{5+}$, more than 30 cation % and 40 cation % or less of $Al^{3+}$, 0.5 to 20 cation % of $Li^+$ and 65 anion % or more of $F^-$ as glass ingredients, and has a liquid phase temperature of 700° C. or less.

In the present description, the contents of cation ingredients and the total contents thereof are expressed by cation %, and the contents of anion ingredients and the total contents thereof are expressed by anion %, unless otherwise specified. In this connection, to contain 0% of a certain ingredient X means that the content of the ingredient X is 0%, and namely, means that the ingredient X is not contained.

The fluorophosphate glass of the present invention may further contain 0 to 15% of $Mg^{2+}$, 5 to 35% of $Ca^{2+}$, 5 to 25% of $Sr^{2+}$, 0 to 20% of $Ba^{2+}$, 0 to 10% of $Na^+$, 0 to 10% of $K^+$ and 0 to 5% of $Y^{3+}$.

Reasons for limitation of the above ranges are described below.

$P^{5+}$ is an essential ingredient and acts as a network former of the glass. When the content of $P^{5+}$ is less than 3%, the stability of the glass is deteriorated extremely. When it exceeds 25%, volatilization of the glass ingredients becomes vigorous, which results in difficulty in obtaining the optically uniform glass or mass-producing the glass having stable optical characteristics. Accordingly, the content of $P^{5+}$ is preferably in a range of 5 to 20%, more preferably in a range of 5 to 15%, and still more preferably in a range of 10 to 15%.

$Al^{3+}$ is an essential ingredient, and acts to improve the stability of the glass. The required amount of $Al^{3+}$ increases with an increase in the content of $F^-$. In the fluorophosphate glass of the present invention containing 65 anion % or more of $F^-$, it becomes necessary to introduce more than 30% of $Al^{3+}$, in order to further improve the stability. However, when the content of $Al^{3+}$ exceeds 40%, the stability of the glass is deteriorated. Accordingly, the content of $Al^{3+}$ is in a range of more than 30% and 40% or less. The content of $Al^{3+}$ is preferably in a range of 30.5 to 38%, more preferably in a range of 31 to 35%, and still more preferably in a range of 32 to 34%.

Although $Li^+$ lowers the viscosity of a glass melt liquid, it has an extremely strong activity to decrease the liquid phase temperature. As a result, it increases the viscosity of the glass at the liquid phase temperature to cause an effect of preventing striae in the case of molding the molten glass. Additionally, it also has an action to decrease the glass transition temperature. When the content of $Li^+$ is less than 0.5%, the above effect is not sufficient. When it exceeds 20%, the viscosity of the glass melt liquid is excessively lowered, which results in difficulty in molding or results in deterioration of stability of the glass to promote crystallization. Accordingly, the content of $Li^+$ is adjusted from 0.5 to 20%. The content of $Li^+$ is preferably in a range of 0.5 to 10%, more preferably in a range of 1 to 5%, and still more preferably in a range of 2 to 5%.

$F^-$ is an essential ingredient for imparting low dispersibility and anomalous dispersibility to the glass. When the content of $F^-$ is less than 65%, it becomes difficult to obtain the desired low dispersibility, and the anomalous dispersibility is also not sufficient. Accordingly, the content of $F^-$ is adjusted to 65% or more. The upper limit of the content of $F^-$ can be considered aiming at 95%. The content of $F^-$ is preferably in a range of 75 to 92%, and more preferably in a range of 80 to 85%.

The anion ingredients in the fluorophosphate glass of the present invention are substantially comprising $F^-$ and $O^{2-}$. In addition to these, a small amount of $Cl^-$ can also be introduced as the anion ingredient. When the molten glass is allowed to flow out of a platinum-based pipe, the glass gets wet upward on an outer peripheral surface of the pipe to cause the occurrence of striae and the like. However, an effect of decreasing "getting wet upward" of the glass melt liquid can be obtained by adding $Cl^-$.

In terms of realizing the glass having excellent stability, the total content of $F^-$ and $O^{2-}$ is preferably 95% or more, more preferably 97% or more, still more preferably 98% or more and yet still more preferably 99% or more.

The liquid phase temperature of the fluorophosphate glass of the present invention is 700° C. or less. In the present invention, viscosity characteristics suitable for molding of the molten glass are obtained by decreasing the liquid phase temperature as described above. When the liquid phase temperature is higher than 700° C., volatilization from a high-temperature glass surface is increased and problems such as the occurrence of striae and fluctuations in optical characteristics are caused. However, such problems can be reduced or solved by adjusting the liquid phase temperature to 700° C. or less. It is preferable that the liquid phase temperature in the present invention is 680° C. or less, and it is more preferable that the temperature is 650° C. or less. Although there is no particular limitation on the lower limit of the liquid phase temperature, it can be considered aiming at 550° C.

$Mg^{2+}$ acts to improve the stability of the glass by introduction thereof up to 15%. Accordingly, the content of $Mg^{2+}$ is preferably from 0 to 15%, more preferably from 1 to 10%, and still more preferably from 2 to 5%.

$Ca^{2+}$ has an effect of increasing the stability of the glass, and is an ingredient required to be increased with an increase in the content. When the content of $Ca^{2+}$ is less than 5%, it is difficult to sufficiently obtain the above effect. When it exceeds 35%, the stability is deteriorated. Accordingly, the content of $Ca^{2+}$ is preferably from 5 to 35%. The content of $Ca^{2+}$ is more preferably in a range of 10 to 30%. The further preferable lower limit of the content of $Ca^{2+}$ is 20%, and the further preferable upper limit of the content of $Ca^{2+}$ is 25%.

$Sr^{2+}$ has an effect of increasing the stability of the glass. When the content thereof is less than 5%, the above effect is not sufficient. When it exceeds 25%, the stability is deteriorated. Accordingly, the content of $Sr^{2+}$ is preferably from 5 to 25%. The content of $Sr^{2+}$ is more preferably in a range of 10 to 25%, and still more preferably in a range of 15 to 20%.

As described above, the stability of the glass can be further improved by allowing $Ca^{2+}$ and $Sr^{2+}$ to coexist.

$Ba^{2+}$ acts so as to improve the stability of the glass by introduction thereof up to 20%. Accordingly, the content of $Ba^{2+}$ is preferably from 0 to 20%. In the glass in which the content of $F^-$ is small, $Ba^{2+}$ has a strong action to improve the stability. However, in the glass in which the amount of $F^-$ is large, it is not an essential ingredient. The content of $Ba^{2+}$ is more preferably in a range of 1 to 15%, and more preferably in a range of 5 to 10%.

In order to further improve the stability of the glass, in the case where the amount of $F^-$ is large, it is preferable to allow $Mg^{2+}$ to coexist with $Ca^{2+}$ and $Sr^{2+}$. In the case where the amount of $F^-$ is small, it is preferable to allow $Ba^{2+}$ to coexist with $Ca^{2+}$ and $Sr^{2+}$.

$Na^+$ acts to decrease the glass transition temperature. However, excessive introduction thereof causes deterioration in the stability of the glass. Furthermore, water resistance thereof is also deteriorated. Accordingly, the content of $Na^+$ is preferably from 0 to 10%. The content of $Na^+$ is more preferably in a range of 0 to 5%, and still more preferably in a range of 0 to 2%.

$K^+$ also acts to decrease the glass transition temperature. However, excessive introduction thereof causes deterioration in the stability of the glass. Additionally, water resistance thereof is also deteriorated. Accordingly, the content of $K^+$ is preferably from 0 to 10%. The content of $K^+$ is more preferably in a range of 0 to 5%, and still more preferably in a range of 0 to 2%.

The stability of the glass can be improved by allowing a plurality of kinds of the alkaline metal ingredients $Li^+$, $Na^+$ and $K^+$ to coexist.

The stability of the glass is expected to be improved by introduction of a small amount of $Y^{3+}$. However, when the content thereof exceeds 5%, the melting temperature of the glass is increased to promote volatilization from the glass, and the stability of the glass is also deteriorated. Accordingly, the content of $Y^{3+}$ is preferably from 0 to 5%. The content of $Y^{3+}$ is more preferably in a range of 0.5 to 3%, and still more preferably in a range of 1 to 3%.

In addition, for the purpose of adjustment of the refractive index or the like, $La^{3+}$, $Gd^{3+}$, $Zr^{4+}$ and $Zn^{2+}$ may be introduced in small amounts.

In this connection, in order to obtain the fluorophosphate glass having excellent moldability of the molten glass and high quality, it is preferable that the total content of $P^{5+}$, $Al^{3+}$, $Li^+$, $Mg^{2+}$, $Ca^{2+}$, $Sr^{2+}$, $Ba^{2+}$, $Na^+$, $K^+$ and $Y^{3+}$ is 95% or more, it is more preferable that the total content is 97% or more, it is still more preferable that the total content is 98% or more, and it is further more preferable that the total content is 99% or more.

Substances whose introduction into the glass should be preferably avoided are described below.

Pb, As, Cd, Ti, Te, Cr, Se, U and Th are not only substances which are unnecessary in the fluorophosphate glass of the present invention, but also substances having high environmental loads. It is therefore preferable that they are not introduced into the glass.

The fluorophosphate glass of the present invention does not require ingredients such as Lu, Sc, Hf and Ge. Since Lu, Sc, Hf and Ge are expensive ingredients, it is preferable that they are not introduced into the glass The fluorophosphate glass of the present invention shows excellent light transmittance over a wide wavelength region in a visible region. In order to take advantage of such property, it is preferable that substances causing coloration such as Cu, Cr, V, Fe, Ni, Co and Nd are not introduced.

It is preferable that the glass transition temperature of the fluorophosphate glass of the present invention is less than 500° C.; it is more preferable that the temperature is 480° C. or less; it is still more preferable that the temperature is 460° C. or less, and it is further more preferable that the temperature is 440° C. or less.

Since the fluorophosphate glass of the present invention has the low glass transition temperature, as described above, the glass is suitable for precision press molding and has an excellent moldability in the case where the glass is re-heated, softened and molded. Since the glass transition temperature is low as described above, the heating temperature at the time of molding can be suppressed to be relatively low. Accordingly, since a chemical reaction of the glass with a mold such as a press mold is hard to occur, a glass molded body having a clean and smooth surface can be molded. Furthermore, deterioration of the mold can also be inhibited.

In the fluorophosphate glass of the present invention, it is preferable that the Abbe number νd is 85 or more; it is more preferable that the Abbe number νd in a range of 88 to 96; and it is further more preferable that the Abbe number νd in a range of 88 to 92.

The refractive index nd is preferably in a range of 1.43 to 1.5, and more preferably in a range of 1.45 to 1.5.

The fluorophosphate glass of the present invention has excellent stability as liquid phase temperature of 700° C. or less with having ultra low dispersibility. Therefore, the high-quality fluorophosphate glass can be provided as an optical element material suitable for correction of color aberration.

In this connection, in terms of suppressing volatility and erosiveness of the fluorophosphate glass, the molar ratio ($O^{2-}/P^{5+}$) of the content of $O^{2-}$ to the content of $P^{5+}$ is preferably 3.5 or more.

As a raw material of the fluorophosphate glass, a phosphate is commonly used. In order to increase the amount of fluorine ($F^-$) incorporated as an anion ingredient as much as possible, a metaphosphate (oxygen atoms/phosphorus atoms=3) having a low ratio (oxygen atoms/phosphorus atom) of the number of oxygen ($O^{2-}$) atoms per one phosphorus ($P^{5+}$) atom is used. However, according to studies of the inventors of the present invention, it has become clear that when the atomic ratio of oxygen atoms per one phosphorus atom in the molten glass is adjusted to 3.5 or more (oxygen atoms/phosphorus atom≥3.5), the amount of the volatile ingredient generated can be substantially reduced, in comparison with a case where when the glass is prepared by using the above metaphosphate, metaphosphoric acid and fluorine which are derived from the raw material react with each other in a molten glass to generate fluorophosphoyl ($POF_3$) as a volatile ingredient. The reason for this is considered to be that as a phosphoric acid which is present in the molten glass, biphosphoric acid having a ratio (oxygen atoms/phosphorus atom) of the number of oxygen ($O^{2-}$) atoms per one phosphorus ($P^{5+}$) atom of 3.5 is more stable than metaphosphoric acid having a ratio (oxygen atoms/phosphorus atom) of the number of oxygen ($O^{2-}$) atoms per one phosphorus ($P^{5+}$) atom of 3. Consequently, when the molar ratio ($O^{2-}/P^{5+}$) of the content of $O^{2-}$ to the content of $P^{5+}$ in the molten glass is adjusted to 3.5 or more, a metaphosphoric acid-free glass is obtained to suppress the generation of fluorophoshoyl as the volatile ingredient by which variations in quality associated with fluctuations of the glass composition is substantially decreased and also the erosiveness of the molten glass is suppressed. As a result, the occurrence of striae associated with volatilization can be reduced. Furthermore, erosion of a melting crucible is also inhibited to prevent materials constituting the crucible from coming to be mixed in the glass as a foreign substance. Thus, the optically uniform, foreign substance-free and high-quality fluorophosphate glass can be obtained. Furthermore, fluctuations of the refractive index at the time of manufacturing the glass can also be reduced or suppressed by inhibiting the volatilization.

As a technique for increasing the molar ratio ($O^{2-}/P^{5+}$), it is considered to relatively increase the content of $O^{2-}$ or to relatively decrease the content of $P^{5+}$. In the present invention, in order to enhance the low dispersibility and anomalous dispersibility, the content of F— of the main cation ingredients is required to be increased to 65 cation %. Accordingly, the molar ratio ($O^{2-}/P^{5+}$) is increased by relatively decreasing the content of $P^{5+}$.

In the glass in which the content of $P^{5+}$ is decreased as described above, it is desired to increase the content of $Al^{3+}$ in order to maintain the glass stability. According to the present invention, the content of $Al^{3+}$ is adjusted to more than 30%, so that the molar ratio ($O^{2-}/P^{5+}$) can be increased with maintaining the liquid phase temperature at 700° C. or less. It is preferable that the molar ratio ($O^{2-}/P^{5+}$) is 3.4 or more; more preferable that the molar ratio is 3.5 or more; and it is further more preferable that the molar ratio is 3.55 or more.

[Method for Manufacturing Fluorophosphate Glass]

The fluorophosphate glass of the present invention can be manufactured by a melting method. One example thereof will be described below. A phosphate, a fluoride and the like corresponding to glass ingredients are used as glass raw materials, and these raw materials are weighed and sufficiently mixed to form blended raw materials. The blended raw materials are put in a platinum crucible, and heated and melted in a temperature range of 850 to 950° C. for about 1 to 3 hours. The molten glass thus obtained is clarified and homogenized to obtain a molten glass, followed by casting in a mold and cooling rapidly, by which the fluorophosphate glass can be manufactured.

[Glass Material for Press Molding]

The glass material for press molding of the present invention is described below.

The glass material for press molding of the present invention is a glass material comprising the above fluorophosphate glass of the present invention.

The above glass material means a lump of glass used for press molding. Examples of the glass materials include the lump of glass corresponding to the mass of a press molded article, such as a preform for precision press molding or a glass gob for press molding of an optical element blank.

The above respective examples will be described below.

The precision press molding preform (hereinafter sometimes simply referred to as the preform) means a glass preform to be heated and used for precision press molding. The precision press molding as used herein is also called mold optics molding as well known in the art, and is a method of forming an optical functional surface of an optical element by transferring a molding surface of a press mold. In this connection, the optical functional surface means a surface which refracts, reflects, diffracts or inputs/outputs light to be controlled, in the optical element, and a lens surface in a lens or the like corresponds to the optical functional surface.

In order to improve extension of the glass along the molding surface with preventing the glass from reacting and being fused with the molding surface of the press mold at the time of precision press molding, it is preferable to coat a surface of the preform with a carbon-containing film. As the carbon-containing film, one containing carbon as a main ingredient (when the element content in the film is represented by atomic %, the content of carbon is larger than the contents of other elements) is preferable. Specifically, examples thereof include a carbon film, a hydrocarbon film and the like. As a method for forming the carbon-containing film, there may be used a known method such as a vacuum deposition method, a sputtering method or an ion plating method, which uses a carbon raw material; or thermal decomposition using a material gas such as a hydrocarbon.

Since many precision press molded articles (for example, optical elements) have a rotationally symmetric axis like a lens, it is desirable that the shape of the preform is a shape having a rotationally symmetric axis. As a specific example thereof, a sphere or one having one rotationally symmetric axis can be indicated. As the shape having one rotationally symmetric axis, there is one having a smooth profile line with no angle or no depression in a cross section including the above rotationally symmetric axis, for example, one having a profile line of an ellipse in which a minor axis thereof agrees with the rotationally symmetric axis in the above cross section. Examples thereof also include a shape formed by flattening a sphere (a shape formed by determining one axis passing through a center of the sphere and shortening the size thereof in a direction of the above axis).

The glass gob for press molding of the optical element blank is the lump of glass which is used when the optical element blank to be finished as the optical element by grinding and polishing is press molded. The optical element blank has a shape in which a processing allowance to be removed by grinding and polishing is added to a shape of the desired optical element, namely a shape approximating a shape of the optical element.

The glass material for press molding of the present invention comprises the fluorophosphate glass having excellent stability, so that the high-quality press molded article can be obtained without the occurrence of devitrification even when the glass material is heated at the time of press molding.

[Method for Manufacturing Glass Molded Body]

The method for manufacturing a glass molded body of the present invention is described below.

The method for manufacturing a glass molded body of the present invention is a method for manufacturing a glass molded body comprising melting glass raw materials and pouring the resulting molten glass into a mold to mold the glass molded body, wherein the grass raw materials are blended and melted in order to obtain the above fluorophosphate glass of the present invention.

According to the present invention, since the fluorophosphate glass having excellent stability is used, the occurrence of striae caused by volatilization from a high-temperature glass surface is reduced or prevented with preventing devitrification. Thus, the high-quality glass molded body can be manufactured.

As an apparatus for melting the glass, a known apparatus for melting the fluorophosphate glass can be used. Blending and melting of the glass raw materials are as described above.

As the mold, a known one may be appropriately used according to a molding shape. For example, a mold having a flat bottom face and three side walls surrounding the bottom face by three sides, with one opened side, is disposed under a pipe through which the molten glass is allowed to flow out, in such a manner that the bottom face becomes horizontal. Then, the molten glass which continuously flows out of the pipe is allowed to flow onto the bottom face of the mold and is molded into a plate shape with filling a portion surrounded by the side walls with the glass. The molded glass is drawn out of the above opening in the horizontal direction at a constant speed to obtain a glass plate having a certain width and a certain thickness. The glass plate drawn out is annealed by passing as it is through an annealing furnace at a slow speed. The annealed glass plate is cut perpendicularly to the drawing-out direction to obtain glass plates having a desired length.

In place of the above mold, a mold having through holes are disposed under the flow pipe in such a manner that the through holes direct toward a vertical direction, and the molten glass is continuously allowed to flow into the through holes. The glass allowed to flow into the holes is rapidly cooled to be molded into a rod shape and is downwardly drawn out of bottom openings of the through holes at a constant speed. The glass rod drawn out of the mold is allowed to pass through the air heated near at the glass transition temperature of the glass to be subjected to such an operation that the surface temperature of the glass rod is approximated to the internal temperature thereof, flowed by cutting the glass rod in the horizontal direction to obtain glass rods having a desired length.

The glass molded body thus obtained may be processed as described later to prepare the glass material for press molding, or may be cut or severed to prepare glass chips, which are ground or polished to obtain optical elements such as lenses and prisms.

[Method for Manufacturing Glass Material for Press Molding]

Feature of the first method for manufacturing a glass material for press molding of the present invention is that the glass molded body manufactured by the above method for manufacturing a glass molded body of the present invention is processed.

For example, the above glass plate or glass rod is divided into chips by cutting or severing, and these glass chips are barrel-polished to perform mass adjustment to obtain the desired mass of one optical element blank. Edges of the glass chips are rounded by barrel polishing, which enables to remove the edges which cause breakage or folding at the time of press molding. Furthermore, a surface of the glass material is roughened, which makes it easy to allow a powdery release agent to be applied onto the surface to uniformly adhere onto the surface at the time of press molding.

Another example is a method of grinding and polishing the above glass chips to obtain a precision press molding preform, and still another method is a method of polishing the surface of the above barrel-polished article to smoothen it to obtain a precision press molding preform.

The second method for manufacturing a glass material for press molding of the present invention is a method for manufacturing a glass material for press molding comprising molding glass raw materials into a preform used for precision press molding in the course of melting the raw materials; allowing the resulting molten glass to flow out; separating a lump of the molten glass from a flow of the molten glass; and cooling the lump of the molten glass, Wherein the glass raw materials are blended and melted in order to obtain the above fluorophosphate glass of the present invention.

In the method, a specific mass of the lump of the molten glass is separated from the molten glass, and cooled to mold the preform having a mass equal to that of the lump of the molten glass. For example, the homogeneous molten glass obtained by melting, clarifying and homogenizing the glass raw materials is allowed to flow out from a temperature-controlled nozzle made of platinum or platinum alloy. In the case where the small-sized preform or the spherical preform is molded, the molten glass is dropped as molten glass droplets having a desired mass from the outflow nozzle, and then they are received by a preform mold and molded as the preform.

In the case where the medium or large-sized preform is manufactured, a flow of the molten glass is allowed to flow down from an outflow pipe, and a leading edge of the flow of the molten glass is received by a preform mold to form a constricted portion between a nozzle of the flow of the molten glass and the preform mold. Thereafter, the preform mold is suddenly dropped directly below, and the flow of the molten glass is separated at the constricted portion by means of the surface tension of the molten glass. A lump of the molten glass having a desired mass is received by a receiving member and molded into the preform.

In either of the above methods, in order to manufacture the preform having a smooth surface free from flaws, stains, wrinkles, surface deteriorations and the like, for example, a free surface, a method of molding the preform with floating the lump of the molten glass by applying the wind pressure thereto above the preform mold or the like, and a method of molding the preform by placing the molten glass droplets in a liquid medium liquefied by cooling a material which is a gas under normal temperature and normal pressure, such as liquid nitrogen are preferable.

In the case where the preform is molded with floating the lump of the molten glass, a gas (referred to as a floating gas) is blown on the lump of the molten glass and the upward wind pressure is applied thereto. In this case, when the viscosity of the lump of the molten glass is too low, the floating gas enters the glass and remains as bubbles in the preform. However, when the viscosity of the lump of the molten glass is adjusted to 3 to 60 dPa·s, the floating gas can float the lump of the molten glass without entering the glass.

Examples of the gas which is used when the floating gas is blown on the preform include air, $N_2$ gas, $O_2$ gas, Ar gas, He gas, vapor and the like. Additionally, the wind pressure is not particularly limited as long as the preform can be floated without coming into contact with a solid such as a mold surface.

The surface of the preform thus manufactured may also be coated with the carbon-containing film to use.

According to the first and second methods for manufacturing a glass material for press molding, the glass material which is not devitrified at the time of press molding can be produced, since the glass material is manufactured by the glass having excellent stability.

[Optical Element Blank and Method for Manufacturing the Same]

The optical element blank of the present invention is described below.

Feature of the optical element blank of the present invention is that it comprises the above fluorophosphate glass of the present invention.

The optical element blank is the glass molded article finished to the optical element by grinding and polishing, as described above, and has the shape in which a processing allowance to be removed by grinding and polishing is added to the shape of the desired optical element, namely the shape approximating the shape of the optical element.

The methods for manufacturing an optical element blank of the present invention is described below.

The first method for manufacturing an optical element blank of the present invention is also called a reheat press method and is a method of heating, softening and press-molding the above glass material for press molding of the present invention or the glass material for press molding manufactured by the method of the present invention.

Prior to heating, the powder release agent such as boron nitride is uniformly applied on the surface of the glass material, and the glass material is placed on a heat-stable dish and put in a heating softening furnace. After heating until the glass is softened, the glass is introduced in a press mold and press molded. Then, the press molded article is taken out of the mold and annealed to eliminate distortion, and adjustment of optical characteristics is performed so that the optical characteristics such as the refractive index are adjusted to desired values. Thus, the optical element blank can be manufactured.

The second method for manufacturing an optical element blank of the present invention is also called a direct press method and is a method for manufacturing an optical element blank comprising melting the raw materials, allowing the resulting molten glass to flow out, separating a lump of the molten glass from a flow of the molten glass, and press-molding the lump of the molten glass, wherein the grass raw materials are blended and melted so as to obtain the above fluorophosphate glass of the present invention.

First, the homogenized molten glass is allowed to flow onto a molding surface of a lower mold on which the powder release agent such as boron nitride is uniformly applied, and a flow of molten glass whose lower end is supported by the lower mold is cut on the middle thereof using a cutting knife called a shear. Thus, a lump of the molten glass having a desired mass is obtained on the molding surface of the lower mold. Then, the lower mold on which the lump of the molten glass is placed is transferred directly below an upper mold standing ready at another position, and the lump of molten glass is pressed with the upper and lower molds to be molded into an optical element blank shape. Next, the press molded article is taken out of the molds and annealed to eliminate distortion, and adjustment of optical characteristics is performed so that the optical characteristics such as the refractive index are adjusted to desired values. Thus, the optical element blank can be manufactured.

Both of the above two methods may be performed in the air. For molding conditions, a material of the press mold, the heating softening furnace, the dish on which the preform is placed at the time of heating and softening and so on, any known conditions and articles may be used.

According to the present invention, the optical element blank which can manufacture the optical element having no defects such as devitrification and striae, and the method for manufacturing the same can be provided.

[Optical Element and Method for Manufacturing the Same]

The optical element of the present invention is described below.

The optical element of the present invention is an optical element comprising the above fluorophosphate glass of the present invention. Specific examples thereof include lenses such as an aspherical lens, a spherical lens, a plano-concave lens, a plano-convex lens, a double-concave lens, double-convex lens, a convex meniscus lens and a concave meniscus lens; a micro lens, a lens array, a diffraction grid-attached lens, a prism, a prism with a lens function and the like. On a surface of the optical element, an anti-reflective film or a partial reflective film having wavelength selectivity may be formed, as needed.

The optical element of the present invention comprises the glass having the low dispersion property and the positive anomalous dispersion property, so that high-order correction of color aberration can be performed by combination with an optical element composed of another glass. Additionally, since the optical element comprises the glass showing a high light transmittance over the entire visible region, the color balance of transmitted light is not deteriorated. Additionally, the optical element can also be suitably used for a lens which guides or collects short-wavelength light. The optical element of the present invention can be suitably used as an optical element constituting an optical system such as an imaging optical system of various cameras such as a digital still camera, a digital video camera, a film type camera, a monitoring camera and an in-vehicle camera, or a projecting optical system of a liquid crystal projector, a rear projector and the like. In particular, it is suitable for a front lens of a telephoto lens.

Furthermore, the optical element is suitable as an optical element which guides light for reading/writing data from/into an optical recording medium such as DVD or CD, for example, an optical pickup lens or a collimator lens, and furthermore, also suitable as an optical element for optical communication.

The methods for manufacturing an optical element of the present invention is described below.

The feature of the first method for manufacturing an optical element of the present invention is that the optical element blank manufactured by the above method of the present invention is ground and polished. Any known methods may be used for the grinding and polishing.

Feature of the second method for manufacturing an optical element of the present invention is that the above glass material for press molding of the present invention or the glass material for press molding manufactured by the method of the present invention is heated and precision press-molded using a press mold. The above glass material as used herein means a preform.

It is preferable that a heating process of the press mold and the preform and a pressing process are performed in a non-oxidative gas atmosphere such as nitrogen gas or a mixed gas of nitrogen gas and hydrogen gas, in order to prevent oxidation of the molding surface of the press mold or a releasing film provided on the above molding surface. In the non-oxidative gas atmosphere, the carbon-containing film coating the surface of the preform is not oxidized, and the above film remains on a surface of the molded article obtained by precision press molding. Although the film has to be finally removed, in order to remove the carbon-containing film relatively easily and completely, the precision press molded article may be heated in an oxidative atmosphere, for example, in the air. The oxidation and removal of the carbon-containing film should be conducted at such a temperature that the precision press molded article is not deformed by heating. Specifically, it is preferable that the oxidation and removal are conducted at a temperature less than the glass transition temperature.

In the precision press molding, the press mold whose molding surface is previously processed into a desired shape with high precision is used. However, the releasing film may be formed on the molding surface in order to prevent melting of the glass at the time of pressing. Examples of the releasing films include a carbon-containing film, a nitride film and a noble metal film, and a hydrogenated carbon film, a carbon film or the like is preferable as the carbon-containing film. In the precision press molding, the preform is supplied between a pair of opposing upper and lower molds whose molding surfaces are shaped with high precision, and then, both of the molds and the preform are heated up to a temperature corresponding to a glass viscosity of $10^5$ to $10^9$ dPa·s to soften the preform, which is then press molded, thereby transferring the molding surface of the mold onto the glass with high precision.

Further, the preform pre-heated up to a temperature corresponding to a glass viscosity of $10^4$ to $10^8$ dPa·s is supplied between a pair of opposing upper and lower molds whose molding surfaces are shaped with high precision, and then press molded in order to transfer the molding surface of the mold onto the glass with high precision.

The pressure and time at the time of pressing may be appropriately determined in consideration of the viscosity of the glass and the like. For example, the press pressure may be about 5 to 15 MPa and the press time may be 10 to 300 seconds. Press conditions such as the press time and the press pressure may be appropriately set within known ranges depending on the shape and dimension of the molded article.

Thereafter, the molds and the precision press molded article are cooled and released, preferably at the time when it reaches a temperature equal to or less than the distortion point, and then the precision press molded article is taken out. In this connection, in order to set optical characteristics to desired values with high precision, annealing conditions of the molded article at the time of cooling, for example, the annealing speed and the like, may be appropriately adjusted.

The above second method for manufacturing an optical element may be roughly divided into the following two methods. The first method is a method for manufacturing an optical element, wherein the glass material for the press molding is introduced into the press mold, and the above glass material and the press mold are heated together to perform the precision press molding. The method is a recommended method when importance is attached to improvement of molding precision such as surface precision and eccentricity precision. The second method is a method for manufacturing an optical element, wherein the glass material is heated and introduced into the press mold which is pre-heated to perform the precision press molding. The method is a recommended method when importance is attached to improvement of productivity.

The second method for manufacturing an optical element is suitable for the production of various aspherical lenses such as a concave meniscus lens, a convex meniscus lens, a double-concave lens, double-convex lens, a plano-convex lens and a plano-concave lens; and small-sized optical elements such as an optical pickup lens and a lens for optical communication.

According to the present invention, the high-quality optical element made of the ultra low dispersion glass and the method for stably manufacturing the above optical element can be provided, since the fluorophosphate glass having excellent stability is used.

EXAMPLES

Although the present invention is described in more detail below by way of examples, the present invention should not be construed as being limited to these examples.

Example 1

So as to obtain glass compositions shown in Table 1 to Table 6, phosphates, fluorides, oxides and the like corresponding to respective glass ingredients were used as raw materials for introducing the respective ingredients, and the raw materials were weighted and sufficiently mixed to prepare blended raw materials. The blended raw materials were put in a platinum crucible, heated and melted. After melting, the molten glass was poured into a mold and allowed to stand to cool to be a glass transition temperature. Immediately thereafter, the glass was placed in an annealing furnace and annealed in a glass transition temperature range of the glass for about 1 hour, followed by standing to cool to room temperature in the furnace. Thus, optical glasses Nos. 1 to 57 were obtained. In the optical glasses thus obtained, no crystal observable under a microscope was precipitated.

The characteristics of the optical glasses thus obtained are shown in Table 1 to Table 6.

In this connection, the various characteristics of the optical glasses were measured by the methods shown below.

(1) Refractive Index nd, Abbe Number νd

For the glass obtained by cooling at a temperature decrease rate of −30° C./hour, the refractive index nd and the Abbe number νd were measured by the refractive index measuring method of the Japan Optical Glass Industry Association.

(2) Liquid Phase Temperature LT

Into a platinum crucible with a lid, 100 g of a glass cullet is put, and held at 950° C. for 30 minutes in a nitrogen atmosphere. Then, the glass melt liquid is transferred to a furnace set to a predetermined temperature in an air atmosphere so as not to decrease the temperature of the glass melt liquid, and held for 2 hours. After maintaining for 2 hours, the glass is taken out of the furnace, and allowed to stand to cool. Thereafter, the glass is magnified and observed under an optical microscope. This operation is repeated at various holding temperatures, and the minimum holding temperature at which no crystal remains is taken as the liquid phase temperature.

(3) Glass Transition Temperature Tg

The glass transition temperature was measured at a temperature increase rate of 10° C./min using a thermomechanical analyzer (TMA) manufactured by RIGAKU Corporation.

TABLE 1

| | No. | 1 | 2 | 3 | 4 | 5 | 6 | 7 | 8 | 9 | 10 |
|---|---|---|---|---|---|---|---|---|---|---|---|
| Cation | P5+ | 14.52 | 11.67 | 11.17 | 11.17 | 11.86 | 11.17 | 11.44 | 11.17 | 11.17 | 11.17 |
| % | Al3+ | 30.88 | 31.59 | 32.08 | 32.09 | 31.40 | 32.09 | 31.82 | 32.09 | 34.09 | 32.09 |
| | Mg2+ | 3.91 | 4.07 | 4.07 | 4.07 | 4.07 | 4.07 | 4.20 | 4.07 | 4.07 | 4.07 |
| | Ca2+ | 22.39 | 23.26 | 25.00 | 23.26 | 23.26 | 23.26 | 23.13 | 23.26 | 23.26 | 23.26 |
| | Sr2+ | 14.52 | 15.09 | 16.09 | 15.09 | 15.09 | 15.09 | 15.09 | 15.09 | 15.09 | 15.09 |
| | Ba2+ | 8.20 | 8.52 | 5.79 | 8.52 | 8.52 | 8.52 | 8.52 | 8.52 | 8.52 | 8.52 |
| | Li+ | 3.00 | 3.12 | 3.12 | 3.12 | 3.12 | 3.12 | 3.12 | 3.12 | 3.12 | 3.12 |
| | Na+ | 0.00 | 0.00 | 0.00 | 0.00 | 0.00 | 0.00 | 0.00 | 0.00 | 0.00 | 0.00 |

TABLE 1-continued

| | No. | 1 | 2 | 3 | 4 | 5 | 6 | 7 | 8 | 9 | 10 |
|---|---|---|---|---|---|---|---|---|---|---|---|
| | K+ | 0.00 | 0.00 | 0.00 | 0.00 | 0.00 | 0.00 | 0.00 | 0.00 | 0.00 | 0.00 |
| | Y3+ | 2.58 | 2.68 | 2.68 | 2.68 | 2.68 | 2.68 | 2.68 | 2.68 | 0.68 | 2.68 |
| | Zn2+ | 0.00 | 0.00 | 0.00 | 0.00 | 0.00 | 0.00 | 0.00 | 0.00 | 0.00 | 0.00 |
| Anion % | O2− | 18.90 | 18.15 | 17.82 | 17.82 | 17.82 | 17.82 | 17.76 | 17.32 | 17.32 | 17.32 |
| | Cl− | 0.00 | 0.18 | 0.18 | 0.18 | 0.18 | 0.18 | 0.18 | 0.18 | 0.18 | 0.18 |
| | F− | 81.10 | 81.67 | 82.00 | 82.00 | 82.00 | 82.00 | 82.06 | 82.50 | 82.50 | 82.50 |
| Molar Ratio O2−/P5+ | | 3.00 | 3.50 | 3.59 | 3.59 | 3.40 | 3.59 | 3.50 | 3.50 | 3.50 | 3.50 |
| nd | | 1.45776 | 1.45886 | 1.45599 | 1.45869 | 1.45781 | 1.45936 | 1.45832 | 1.45729 | 1.45305 | 1.45762 |
| νd | | 90.1 | 90 | 90.5 | 90.1 | 90.1 | 90.6 | 90.4 | 90.4 | 91.2 | 90.4 |
| Tg (° C.) | | 419 | 425 | 420 | 424 | | 424 | 420 | 415 | 426 | 422 |
| LT (° C.) | | 650 | 620 | 610 | 620 | 620 | 620 | 610 | 620 | 650 | 600 |

(Note 1)
Tg: Glass Transition Temperature
(Note 2)
LT: Liquid Phase Temperature

TABLE 2

| | No. | 11 | 12 | 13 | 14 | 15 | 16 | 17 | 18 | 19 | 20 |
|---|---|---|---|---|---|---|---|---|---|---|---|
| Cation % | P5+ | 6.80 | 6.17 | 6.00 | 6.17 | 5.67 | 5.42 | 5.42 | 5.42 | 5.42 | 5.42 |
| | Al3+ | 35.80 | 36.09 | 35.80 | 34.09 | 34.59 | 33.70 | 33.70 | 33.69 | 33.70 | 33.20 |
| | Mg2+ | 4.30 | 3.07 | 4.30 | 4.07 | 4.07 | 6.83 | 6.83 | 6.83 | 6.83 | 7.83 |
| | Ca2+ | 23.70 | 25.38 | 24.50 | 26.38 | 23.26 | 28.72 | 28.72 | 30.52 | 28.72 | 28.22 |
| | Sr2+ | 18.40 | 15.09 | 18.40 | 15.09 | 15.09 | 17.16 | 17.16 | 17.16 | 17.16 | 17.16 |
| | Ba2+ | 6.00 | 8.52 | 6.00 | 8.52 | 8.52 | 4.70 | 4.70 | 2.91 | 4.70 | 4.70 |
| | Li+ | 2.30 | 2.00 | 2.30 | 3.00 | 6.12 | 1.00 | 1.00 | 1.00 | 1.00 | 1.00 |
| | Na+ | 0.00 | 0.00 | 0.00 | 0.00 | 0.00 | 1.20 | 1.20 | 1.20 | 1.20 | 1.20 |
| | K+ | 0.00 | 0.00 | 0.00 | 0.00 | 0.00 | 0.00 | 0.00 | 0.00 | 0.00 | 0.00 |
| | Y3+ | 2.70 | 3.68 | 2.70 | 2.68 | 2.68 | 1.27 | 1.27 | 1.27 | 1.27 | 1.27 |
| | Zn2+ | 0.00 | 0.00 | 0.00 | 0.00 | 0.00 | 0.00 | 0.00 | 0.00 | 0.00 | 0.00 |
| Anion % | O2− | 10.22 | 9.21 | 9.01 | 8.90 | 8.70 | 7.96 | 8.43 | 8.24 | 8.24 | 8.17 |
| | Cl− | 0.17 | 0.17 | 0.17 | 0.17 | 0.18 | 0.87 | 0.00 | 0.17 | 0.17 | 0.17 |
| | F− | 89.61 | 90.62 | 90.82 | 90.93 | 91.12 | 91.17 | 91.57 | 91.59 | 91.59 | 91.66 |
| Molar Ratio O2−/P5+ | | 3.50 | 3.50 | 3.50 | 3.34 | 3.50 | 3.39 | 3.57 | 3.50 | 3.50 | 3.50 |
| nd | | 1.43915 | 1.43821 | 1.43696 | 1.43958 | 1.43761 | 1.43389 | 1.43284 | 1.43052 | 1.43295 | 1.43128 |
| νd | | 94.9 | 95.5 | 95.2 | 94.9 | 94.9 | 94.7 | 93.2 | 95.9 | 96 | 96.3 |
| Tg (° C.) | | | 410 | | 406 | 395 | 418 | 418 | | 415 | 421 |
| LT (° C.) | | 650 | 650 | 670 | 650 | 650 | 650 | 650 | 650 | 650 | 650 |

(Note 1)
Tg: Glass Transition Temperature
(Note 2)
LT: Liquid Phase Temperature

TABLE 3

| | No. | 21 | 22 | 23 | 24 | 25 | 26 | 27 | 28 | 29 | 30 |
|---|---|---|---|---|---|---|---|---|---|---|---|
| Cation % | P5+ | 5.42 | 5.52 | 5.42 | 5.42 | 5.42 | 5.17 | 5.17 | 5.17 | 5.17 | 5.27 |
| | Al3+ | 33.20 | 33.90 | 33.70 | 33.70 | 33.70 | 35.09 | 35.09 | 36.09 | 35.09 | 35.99 |
| | Mg2+ | 6.83 | 5.93 | 6.83 | 5.83 | 6.83 | 4.07 | 4.07 | 4.07 | 4.07 | 2.03 |
| | Ca2+ | 29.22 | 27.92 | 28.72 | 27.72 | 28.72 | 27.26 | 25.38 | 25.38 | 25.38 | 25.98 |
| | Sr2+ | 17.16 | 17.36 | 17.16 | 18.16 | 16.16 | 15.09 | 15.09 | 15.09 | 15.09 | 15.13 |
| | Ba2+ | 4.70 | 5.90 | 4.70 | 5.70 | 4.70 | 4.52 | 9.52 | 8.52 | 8.52 | 8.92 |
| | Li+ | 1.00 | 1.00 | 1.00 | 1.00 | 1.00 | 6.12 | 3.00 | 3.00 | 3.00 | 3.00 |
| | Na+ | 1.20 | 1.20 | 1.20 | 1.20 | 1.20 | 0.00 | 0.00 | 0.00 | 0.00 | 0.00 |
| | K+ | 0.00 | 0.00 | 0.00 | 0.00 | 0.00 | 0.00 | 0.00 | 0.00 | 0.00 | 0.00 |
| | Y3+ | 1.27 | 1.27 | 1.27 | 1.27 | 1.27 | 2.68 | 2.68 | 2.68 | 3.68 | 3.68 |
| | Zn2+ | 0.00 | 0.00 | 0.00 | 0.00 | 1.00 | 0.00 | 0.00 | 0.00 | 0.00 | 0.00 |
| Anion % | O2− | 8.17 | 8.28 | 8.24 | 8.24 | 8.24 | 7.91 | 7.80 | 7.77 | 7.77 | 7.64 |
| | Cl− | 0.17 | 0.00 | 0.00 | 0.00 | 0.00 | 0.17 | 0.17 | 0.17 | 0.17 | 0.17 |
| | F− | 91.66 | 91.72 | 91.76 | 91.76 | 91.76 | 91.92 | 92.03 | 92.06 | 92.06 | 92.19 |
| Molar Ratio O2−/P5+ | | 3.50 | 3.50 | 3.50 | 3.50 | 3.50 | 3.50 | 3.50 | 3.50 | 3.50 | 3.39 |
| nd | | 1.43256 | 1.43252 | 1.43229 | 1.4345 | 1.43224 | 1.43165 | 1.43795 | 1.43644 | 1.43811 | 1.44166 |
| νd | | 95.9 | 95.9 | 96.9 | 95.9 | 96.1 | 95.7 | 95.4 | 95.7 | 95.7 | 94.6 |
| Tg (° C.) | | 418 | 417 | 418 | 419 | 415 | | 407 | 410 | 409 | |
| LT (° C.) | | 650 | 650 | 650 | 650 | 650 | 650 | 650 | 650 | 650 | 650 |

(Note 1)
Tg: Glass Transition Temperature
(Note 2)
LT: Liquid Phase Temperature

TABLE 4

| No. | | 31 | 32 | 33 | 34 | 35 | 36 | 37 | 38 | 39 | 40 |
|---|---|---|---|---|---|---|---|---|---|---|---|
| Cation % | P5+ | 5.27 | 4.67 | 11.67 | 11.17 | 11.17 | 11.17 | 11.44 | 11.17 | 11.17 | 11.17 |
| | Al3+ | 35.59 | 35.59 | 31.59 | 32.08 | 32.09 | 32.09 | 31.82 | 32.09 | 34.09 | 32.09 |
| | Mg2+ | 2.77 | 4.07 | 4.07 | 4.07 | 4.07 | 4.07 | 4.20 | 4.07 | 4.07 | 4.07 |
| | Ca2+ | 25.68 | 23.26 | 23.26 | 25.00 | 23.26 | 23.26 | 23.13 | 23.26 | 23.26 | 23.26 |
| | Sr2+ | 15.29 | 15.09 | 15.09 | 16.09 | 15.09 | 15.09 | 15.09 | 15.09 | 15.09 | 15.09 |
| | Ba2+ | 8.72 | 8.52 | 8.52 | 5.79 | 8.52 | 8.52 | 8.52 | 8.52 | 8.52 | 8.52 |
| | Li+ | 3.00 | 6.12 | 3.12 | 3.12 | 3.12 | 3.12 | 3.12 | 3.12 | 3.12 | 3.12 |
| | Na+ | 0.00 | 0.00 | 0.00 | 0.00 | 0.00 | 0.00 | 0.00 | 0.00 | 0.00 | 0.00 |
| | K+ | 0.00 | 0.00 | 0.00 | 0.00 | 0.00 | 0.00 | 0.00 | 0.00 | 0.00 | 0.00 |
| | Y3+ | 3.68 | 2.68 | 2.68 | 2.68 | 2.68 | 2.68 | 2.68 | 2.68 | 0.68 | 2.68 |
| | Zn2+ | 0.00 | 0.00 | 0.00 | 0.00 | 0.00 | 0.00 | 0.00 | 0.00 | 0.00 | 0.00 |
| Anion % | O2− | 7.25 | 7.12 | 18.15 | 17.82 | 17.82 | 17.82 | 17.76 | 17.32 | 17.32 | 17.32 |
| | Cl− | 0.17 | 0.17 | 0.18 | 0.18 | 0.18 | 0.18 | 0.18 | 0.18 | 0.18 | 0.18 |
| | F− | 92.58 | 92.71 | 81.67 | 82.00 | 82.00 | 82.00 | 82.06 | 82.50 | 82.50 | 82.50 |
| Molar Ratio O2−/P5+ | | 3.25 | 3.50 | 3.50 | 3.59 | 3.59 | 3.59 | 3.50 | 3.50 | 3.50 | 3.50 |
| nd | | 1.439 | 1.43382 | 1.45886 | 1.45599 | 1.45869 | 1.45936 | 1.45832 | 1.45729 | 1.45305 | 1.45762 |
| vd | | 95.2 | 95.6 | 90 | 90.5 | 90.1 | 90.6 | 90.4 | 90.4 | 91.2 | 90.4 |
| Tg (° C.) | | | 390 | 425 | 420 | 424 | 424 | 420 | 415 | 426 | 422 |
| LT (° C.) | | 650 | 670 | 620 | 610 | 620 | 620 | 610 | 620 | 650 | 600 |

(Note 1)
Tg: Glass Transition Temperature
(Note 2)
LT: Liquid Phase Temperature

TABLE 5

| No. | | 41 | 42 | 43 | 44 | 45 | 46 | 47 | 48 | 49 | 50 |
|---|---|---|---|---|---|---|---|---|---|---|---|
| Cation % | P5+ | 6.80 | 6.17 | 6.00 | 5.42 | 5.42 | 5.42 | 5.42 | 5.42 | 5.42 | 5.42 |
| | Al3+ | 35.80 | 36.09 | 35.80 | 33.70 | 33.69 | 33.70 | 33.20 | 33.20 | 33.70 | 33.70 |
| | Mg2+ | 4.30 | 3.07 | 4.30 | 6.83 | 6.83 | 6.83 | 7.83 | 6.83 | 5.83 | 6.83 |
| | Ca2+ | 23.70 | 25.38 | 24.50 | 28.72 | 30.52 | 28.72 | 28.22 | 29.22 | 27.72 | 28.72 |
| | Sr2+ | 18.40 | 15.09 | 18.40 | 17.16 | 17.16 | 17.16 | 17.16 | 17.16 | 17.16 | 17.16 |
| | Ba2+ | 6.00 | 8.52 | 6.00 | 4.70 | 2.91 | 4.70 | 4.70 | 4.70 | 5.70 | 4.70 |
| | Li+ | 2.30 | 2.00 | 2.30 | 1.00 | 1.00 | 1.00 | 1.00 | 1.00 | 1.00 | 1.00 |
| | Na+ | 0.00 | 0.00 | 0.00 | 1.20 | 1.20 | 1.20 | 1.20 | 1.20 | 1.20 | 1.20 |
| | K+ | 0.00 | 0.00 | 0.00 | 0.00 | 0.00 | 0.00 | 0.00 | 0.00 | 1.00 | 0.00 |
| | Y3+ | 2.70 | 3.68 | 2.70 | 1.27 | 1.27 | 1.27 | 1.27 | 1.27 | 1.27 | 1.27 |
| | Zn2+ | 0.00 | 0.00 | 0.00 | 0.00 | 0.00 | 0.00 | 0.00 | 0.00 | 0.00 | 0.00 |
| Anion % | O2− | 10.22 | 9.21 | 9.01 | 8.43 | 8.24 | 8.24 | 8.17 | 8.17 | 8.28 | 8.24 |
| | Cl− | 0.17 | 0.17 | 0.17 | 0.00 | 0.17 | 0.17 | 0.17 | 0.17 | 0.00 | 0.00 |
| | F− | 89.61 | 90.62 | 90.82 | 91.57 | 91.59 | 91.59 | 91.66 | 91.66 | 91.72 | 91.76 |
| Molar Ratio O2−/P5+ | | 3.50 | 3.50 | 3.50 | 3.57 | 3.50 | 3.50 | 3.50 | 3.50 | 3.50 | 3.50 |
| nd | | 1.43915 | 1.43821 | 1.43696 | 1.43284 | 1.43062 | 1.43295 | 1.43128 | 1.43256 | 1.43252 | 1.43229 |
| vd | | 94.9 | 95.5 | 95.2 | 93.2 | 95.9 | 96 | 96.3 | 95.9 | 95.9 | 96.9 |
| Tg (° C.) | | | 410 | | 418 | | 415 | 421 | 418 | 417 | 418 |
| LT (° C.) | | 650 | 650 | 670 | 650 | 650 | 650 | 650 | 650 | 650 | 650 |

(Note 1)
Tg: Glass Transition Temperature
(Note 2)
LT: Liquid Phase Temperature

TABLE 6

| No. | | 51 | 52 | 53 | 54 | 55 | 56 | 57 |
|---|---|---|---|---|---|---|---|---|
| Cation % | P5+ | 5.42 | 5.42 | 5.17 | 5.17 | 5.17 | 5.17 | 4.67 |
| | Al3+ | 33.70 | 33.70 | 35.09 | 35.09 | 35.09 | 35.09 | 35.59 |
| | Mg2+ | 5.83 | 6.83 | 4.07 | 4.07 | 4.07 | 4.07 | 4.07 |
| | Ca2+ | 27.72 | 28.72 | 27.26 | 25.38 | 25.38 | 25.38 | 23.26 |
| | Sr2+ | 18.16 | 16.16 | 15.09 | 15.09 | 15.09 | 15.09 | 15.09 |
| | Ba2+ | 5.70 | 4.70 | 4.52 | 9.52 | 8.52 | 8.52 | 8.52 |
| | Li+ | 1.00 | 1.00 | 6.12 | 3.00 | 3.00 | 3.00 | 6.12 |
| | Na+ | 1.20 | 1.20 | 0.00 | 0.00 | 0.00 | 0.00 | 0.00 |
| | K+ | 0.00 | 0.00 | 0.00 | 0.00 | 0.00 | 0.00 | 0.00 |
| | Y3+ | 1.27 | 1.27 | 2.68 | 2.68 | 2.68 | 3.68 | 2.68 |
| | Zn2+ | 0.00 | 1.00 | 0.00 | 0.00 | 0.00 | 0.00 | 0.00 |
| Anion % | O2− | 8.24 | 8.24 | 7.91 | 7.80 | 7.77 | 7.77 | 7.12 |
| | Cl− | 0.00 | 0.00 | 0.17 | 0.17 | 0.17 | 0.17 | 0.17 |
| | F− | 91.76 | 91.76 | 91.92 | 92.03 | 92.06 | 92.06 | 92.71 |

TABLE 6-continued

| No. | 51 | 52 | 53 | 54 | 55 | 56 | 57 |
|---|---|---|---|---|---|---|---|
| Molar Ratio O2−/P5+ | 3.50 | 3.50 | 3.50 | 3.50 | 3.50 | 3.50 | 3.50 |
| nd | 1.4345 | 1.43224 | 1.43165 | 1.43795 | 1.43644 | 1.43811 | 1.43382 |
| vd | 95.9 | 96.1 | 95.7 | 95.4 | 95.7 | 95.7 | 95.8 |
| Tg (° C.) | 419 | 415 | | 407 | 410 | 409 | 390 |
| LT (° C.) | 650 | 650 | 650 | 650 | 650 | 650 | 670 |

(Note 1)
Tg: Glass Transition Temperature
(Note 2)
LT: Liquid Phase Temperature

Example 2

The glass raw materials blended so as to obtain the respective optical glasses manufactured in Example 1 were melted, clarified and homogenized to produce molten glasses. The molten glasses were dropped as molten glass droplets from a nozzle made of platinum; received by a preform mold; and molded into a spherical preform composed of each of the above various glasses with floating the molten glass by applying the wind pressure thereto.

Additionally, the above molten glasses were allowed to continuously flow out from a pipe made of platinum, and a lower end thereof was received by a preform mold to form a constricted portion in a flow of the molten glass. Thereafter, the preform mold is suddenly dropped directly below to cut the flow of the molten glass at the constricted portion. A lump of the molten grass separated was received on the preform mold and molded into a preform comprising each of the above various glasses with floating the lump of the molten glass by applying the wind pressure thereto.

The resulting preforms were optically homogeneous, and no devitrification was also observed therein.

Example 3

The molten glasses provided in Example 2 were allowed to continuously flow out; cast in a mold; and molded into a glass block. Thereafter, the glass block was annealed and cut to obtain a plurality of glass chips. These glass chips were ground and polished to manufacture a preform comprising each of the above various glasses. The resulting preforms were optically homogeneous, and no devitrification was also observed therein.

Example 4

The molten glasses provided in Example 2 were allowed to continuously flow out; cast in a mold; and molded into a glass block. Thereafter, the glass block was annealed and cut to obtain a plurality of glass chips. These glass chips were barrel—polished to prepare a glass gob for press molding comprising each of the above various glasses. The insides of the resulting glass gobs were optically homogeneous, and no devitrification was also observed therein.

Example 5

The preforms manufactured in Examples 1 and 2 were coated with a carbon-containing film on surfaces thereof, and introduced into a press mold comprising upper and lower molds made of SiC with a carbon-containing film provided on molding surfaces thereof and a barrel mold. The press mold and the preform were heated together in a nitrogen atmosphere to soften the preform, which was precision press-molded. Thus, various lenses of aspherical convex meniscus lenses, aspherical concave meniscus lenses, aspherical double-convex lenses, aspherical double-concave lenses and optical pickup lenses, comprising the above various glasses were prepared.

Example 6

A powdery release agent comprising boron nitride was uniformly applied to surfaces of the glass gobs manufactured in Example 4, followed by heating and softening in an air atmosphere. Press molding was performed by a press mold to manufacture blanks of various lenses of spherical convex meniscus lenses, spherical concave meniscus lenses, spherical double-convex lenses and spherical double-concave lenses. Thus, the lens blanks comprising the above various glasses were manufactured.

Example 7

The molten glasses prepared in Example 2 were allowed to flow out, and a flow of the molten glass was cut using a shear to separate a lump of the molten glass. Press molding was performed using a press mold to manufacture blanks of various lenses of spherical convex meniscus lenses, spherical concave meniscus lenses, spherical double-convex lenses and spherical double-concave lenses. Thus, the lens blanks comprising the above various glasses were manufactured. The insides of the resulting glass blanks were optically homogeneous, and no devitrification was also observed therein.

Example 8

The lens blanks manufactured in Example 6 and Example 7 were each annealed to eliminate distortion, and the refractive index was adjusted to a desired value, followed by grinding and polishing to prepare various lenses of spherical convex meniscus lenses, spherical concave meniscus lenses, spherical double-convex lenses and spherical double-concave lenses. Thus, the lenses comprising the above various glasses were prepared.

Example 9

The molten glasses prepared in Example 2 were allowed to flow out, and cast in a mold to prepare a glass block. The glass block was cut, ground and polished to prepare various spherical lenses and prisms. The resulting lenses and prisms were optically homogeneous, and no devitrification was also observed therein.

While the present invention has been described in detail with reference to specific embodiments thereof, it will be apparent to one skilled in the art that various changes and modifications may be made therein without departing from the spirit and scope of the present invention.

This application is based on Japanese Patent Application No. 2008-047135 filed on Feb. 28, 2008 and the entire contents thereof being hereby incorporated by reference.

INDUSTRIAL APPLICABILITY

The fluorophosphate glass of the present invention is a glass having excellent glass stability and ultra low dispersibility, and is suitably used for manufacturing glass materials for press molding such as preforms for precision press molding, optical element blanks and optical elements.

The invention claimed is:

1. A fluorophosphate glass comprising
3 to 25 cation % of $P^{5+}$,
more than 30 cation % and 40 cation % or less of $Al^{3+}$,
0.5 to 20 cation % of $Li^+$ and
65 anion % or more of $F^-$ as glass ingredients, and
having a liquid phase temperature of 700° C. or less, wherein the molar ratio of $O^{2-}/P^{5+}$ is 3.50 or more.

2. The fluorophosphate glass according to claim 1 comprising
0 to 15% of $Mg^{2+}$,
5 to 35% of $Ca^{2+}$,
5 to 25% of $Sr^{2+}$,
0 to 20% of $Ba^{2+}$,
0 to 10% of $Na^+$,
0 to 10% of $K^+$ and
0 to 5% of $Y^{3+}$, expressed by cation %.

3. The fluorophosphate glass according to claim 1 having an Abbe number vd of 85 to 98.

4. A glass material for press molding comprising the fluorophosphate glass according to claim 1.

5. An optical element blank comprising the fluorophosphate glass according to claim 1.

6. An optical element comprising the fluorophosphate glass according to claim 1.

7. A method for manufacturing a glass molded body comprising melting glass raw materials and pouring the resulting molten glass into a mold to mold the glass molded body, wherein
the glass raw materials are blended and melted so as to obtain the fluorophosphate glass according to claim 1.

8. A method for manufacturing a glass material for press molding comprising processing the glass molded body manufactured by the method according to claim 7.

9. A method for manufacturing a glass material for press molding comprising molding glass raw materials into a preform used for precision press molding in the course of melting the raw materials; allowing the resulting molten glass to flow out; separating a lump of the molten glass from a flow of the molten glass; and cooling the lump of the molten glass, wherein
the glass raw materials are blended and melted so as to obtain the fluorophosphate glass according to claim 1.

10. A method for manufacturing an optical element blank comprising heating, softening and press-molding the glass material for press molding according to claim 4.

11. A method for manufacturing an optical element blank comprising melting raw materials; allowing the resulting molten glass to flow out; separating a lump of the molten glass from a flow of the molten glass; and press-molding the lump of the molten glass, wherein
the glass raw materials are blended and melted so as to obtain the fluorophosphate glass according to claim 1.

12. A method for manufacturing an optical element comprising grinding and polishing the optical element blank manufactured by the method according to claim 10.

13. A method for manufacturing an optical element comprising heating and precision press-molding the glass material for press molding according to claim 4 using a press mold.

14. The method for manufacturing an optical element according to claim 13, wherein the glass material for press molding is introduced into the press mold, and the glass material and the press mold are heated together to perform the precision press molding.

15. The method for manufacturing an optical element according to claim 13, wherein the glass material for press molding is heated and introduced into the press mold which is pre-heated to perform the precision press molding.

16. A method for manufacturing an optical element blank comprising heating, softening and press-molding the glass material for press molding manufactured by the method according to claim 8.

17. A method for manufacturing an optical element comprising heating and precision press-molding the glass material for press molding manufactured by the method according to claim 9 using a press mold.

* * * * *